United States Patent [19]

Jackson

[11] 4,337,009

[45] Jun. 29, 1982

[54] MARINE LANDING STRUCTURE WITH OMNI DIRECTIONAL ENERGY ABSORBING CHARACTERISTICS

[75] Inventor: Jay W. Jackson, Corsicana, Tex.

[73] Assignee: Regal International, Inc., Tex.

[21] Appl. No.: 61,266

[22] Filed: Jul. 27, 1979

[51] Int. Cl.³ ............................................. E02B 3/22
[52] U.S. Cl. .................................................. 405/212
[58] Field of Search ............... 405/212, 213, 214, 215; 114/219, 220; 267/139

[56] References Cited

U.S. PATENT DOCUMENTS

| | | | |
|---|---|---|---|
| 1,547,511 | 7/1925 | Maciejczyk et al. | 405/212 X |
| 2,655,005 | 10/1953 | Kinneman | 405/215 |
| 3,235,244 | 2/1966 | Hein | 267/153 |
| 3,254,491 | 6/1966 | Levinton | 405/213 |
| 3,459,004 | 8/1969 | Morini | 405/215 |
| 3,564,858 | 2/1971 | Pogonowski | 405/212 |
| 3,864,922 | 2/1975 | Dial et al. | 405/215 |
| 3,890,916 | 6/1975 | Tümmers et al. | 405/215 X |
| 3,933,111 | 1/1976 | Von Bose et al. | 114/219 |
| 3,937,170 | 2/1976 | Drewett | 114/219 |
| 3,995,437 | 12/1976 | Drewett | 405/215 |
| 4,043,545 | 8/1977 | Dial et al. | 267/116 |
| 4,058,984 | 11/1977 | Weidler et al. | 405/212 |
| 4,109,474 | 8/1978 | Files et al. | 405/213 |

*Primary Examiner*—David H. Corbin
*Attorney, Agent, or Firm*—John F. Booth; Gerald G. Crutsinger; Monty L. Ross

[57] ABSTRACT

A shock absorbing boat landing (10) is provided for attachment to a marine structure (14) such as an offshore platform or the like. The system (10) has a landing frame (16) which is supported by two pairs of upper and lower shock cells (22a and 22b). The landing frame (16) is pivotally coupled at (40 and 42) to the operative arms (26) of the shock element so that relative rotation between the operative arm (26) of the shock cells and the frame (16) can occur about a vertically extending axis whereby improved shock absorbing characteristics can be obtained.

10 Claims, 9 Drawing Figures

MARINE LANDING STRUCTURE WITH OMNI DIRECTIONAL ENERGY ABSORBING CHARACTERISTICS

TECHNICAL FIELD

The present invention relates to boat and barge landing assemblies for attachment to marine structures to protect the structures from damage from contact with vessels such as barges and boats and the like, and in particular to a boat landing assembly for attachment to a marine structure wherein the boat landing assembly is provided with means for absorbing shock efficiently in not only the normal but also lateral directions.

BACKGROUND ART

In the production of the worlds petroleum reserves it has been a practice to erect offshore platforms from which drilling and production of these petroleum products can be accomplished. To service these platforms, vessels such as boats and barges are used to transport men and material to and from these platforms. When loading and unloading equipment, it has been necessary to dock these vessels against the platforms to unload equipment and supplies. It has also been a practice in the past to construct boat landings on these marine structures adjacent to the water levels for use in docking these vessels at the platform. These boat landing assemblies have been designed to protect the platform and the vessel from damage due to collision between the vessel and the platform. In some instances, boat landings have been provided with shock or energy absorbing devices to assist in preventing damage from collision.

As the need for petroleum products is increased, offshore drilling and production of the world's reserves has moved from the shallower areas of the Gulf of Mexico where mild climates are present to deeper waters such as the North Sea where severe climates create enormous wind and wave forces on vessels servicing the platform. Prior art boat landings designed for shallow waters and mild climates have not provided the required energy absorbing characteristics in all directions of normal loading during the use of these assemblies.

An example of a prior art boat landing is shown in the U.S. Pat. No. 3,937,170, entitled "Bumper Guard and Arrangement for Water Covered Areas." This boat landing system consists of a rigid metallic frame with a plurality of resilient strips mounted on the exposed surface thereof to contact the vessel. It is important to note that the entire assembly is rigidly welded to the legs of the platform, and the energy absorbing characteristics of the system are accomplished through compression of the rubber strips thereon.

Another example is found in the United States Pat. No. 4,058,984, entitled "Marine Cushioning Unit." This patent discloses a boat landing structure coupled to the platform through a plurality of shock mounts. This system provides good shock absorbing characteristics in a direction normal to the face of the boat landing structure but, because of the location of the element 16, lateral components of shock are not efficiently absorbed because of the necessity of compressing a shock element 16 to absorb lateral shocks. Therefore, this system does not accommodate lateral loading on the landing structure.

Another prior art bumper system which does not absorb shock loads in the lateral direction is shown in U.S. Pat. No. 3,933,111, entitled "Dock Bumper Unit." In this system, the presence of shock loading on the bumper system by forces applied normal to the surface of the bumper is recognized. However, the patent teaches that lateral displacement of the bumper relative to the pier in response to components of dynamic forces exerted parallel to the bumper is rigidly restrained at all times. This is achieved by use of vertically inclined counter elements which exert generally lateral tensile forces between the bumper and the pier. Thus, the system of this patent does not provide an energy absorbing function for forces which are applied in the direction other than normal to the face of the bumper system. This structure rather than solving the problems of lateral loading suggests a structure which provides no shock absorbing characteristics in a direction lateral to the bumper.

Another system is shown in U.S. Pat. No. 3,564,858 and is entitled "Boat Landing for Offshore Structure." In this patent the landing system illustrated is connected to the platform by upper and lower elements. The upper elements appear to be the major shock absorbing element of the system. It also appears that the upper shock absorbing element has no shock absorbing characteristics in directions parallel or lateral to the face of the fender assembly. The plunger of the shock absorber, however, does function to pivotally connect the shock absorbing element through a pin joint or the like to the fender assembly. It appears, however, that this pivot in the arrangement lies in a horizontal axis and does not provide for absorption of shock loads applied in a lateral direction.

Another prior art system for protecting marine structures is shown in the pending Application Ser. No. 845,111, filed Oct. 25, 1977, and now abandoned. In this system, a boat landing structure is supported at its ends by upper and lower shock cells. The operative element of which is welded to the boat landing thus preventing relative movement between the shock cell and the boat landing. If lateral loads are applied to the system, the shock must be taken up in compression of the resilient element in the shock cell thus preventing any substantial lateral shock absorbing characteristics in the system.

Although these prior art bumper systems are representative of the systems currently in use and have proved satisfactory in some environments, they have not proved entirely satisfactory where the absorption of lateral loads or shocks is necessary.

DISCLOSURE OF THE INVENTION

A shock absorbing boat landing is provided for protecting a marine structure against excessive shock loads in directions not only normal to the face of the landing system but also in directions having lateral components parallel to the face of the landing system. The system utilizes a conventional boat landing frame which is coupled through a vertically extending axis to shock absorbing elements which have energy absorbing characteristics not only in a direction normal to the face of the landing system but also in torsion.

In one embodiment, a pair of shock frames are supported from a platform by upper and lower shock cells. A boad landing is pivotally connected from the shock frame. The pivot provides movement about a vertical axis to allow vertical rotation between the boat landing frame and the shock frames. This allows the system to collapse while the shock cells absorb energy in a tortional mode when shock loads are applied to the system in a lateral direction.

BRIEF DESCRIPTION OF DRAWINGS

For a complete understanding of the present invention and the advantages thereof, reference is now made to the following Description taken in conjunction with the accompanying drawings in which.

DETAILED DESCRIPTION OF THE INVENTION

Figure 1:
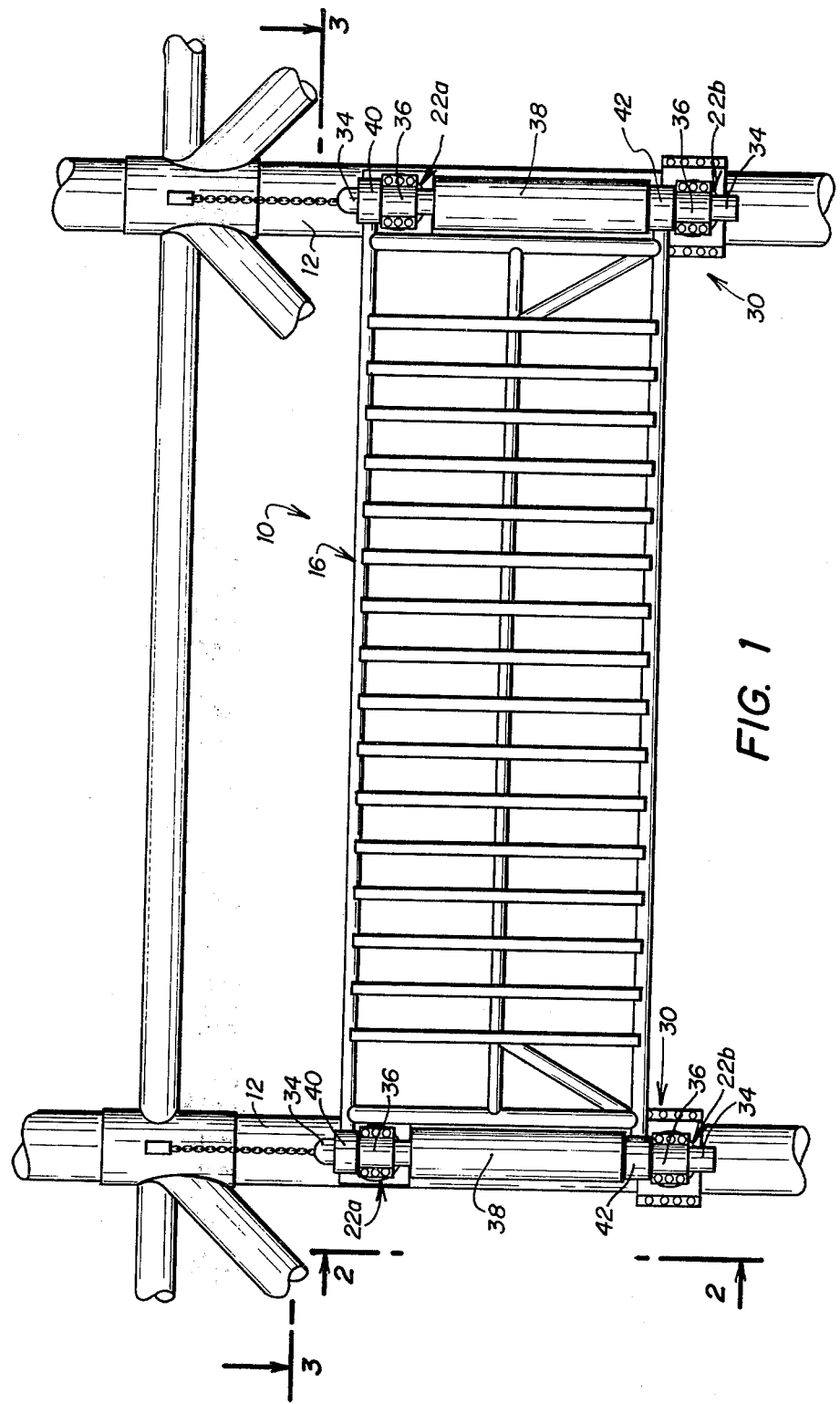
FIG. 1 is a front elevation view of one embodiment of the marine landing structure of the present invention shown attached to the platform.

For purposes of understanding the present invention, one embodiment of a marine landing structure incorporating the present invention will be described. In this description, reference will be made to the accompanying drawings. Throughout the description reference characters will be used to identify in the drawings various parts and elements of the system. These reference characters will be used throughout the description and in the various FIGURES of this patent to describe the same or corresponding parts.

Figure 2:
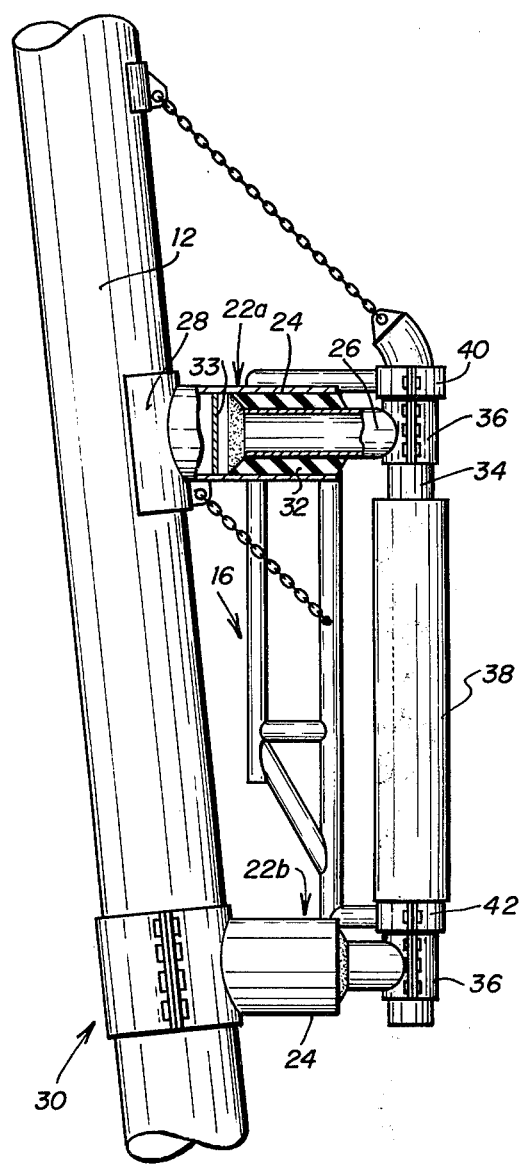
FIG. 2 is a side elevation view looking in the direction of arrows 2—2 of FIG. 1.
Figure 3:
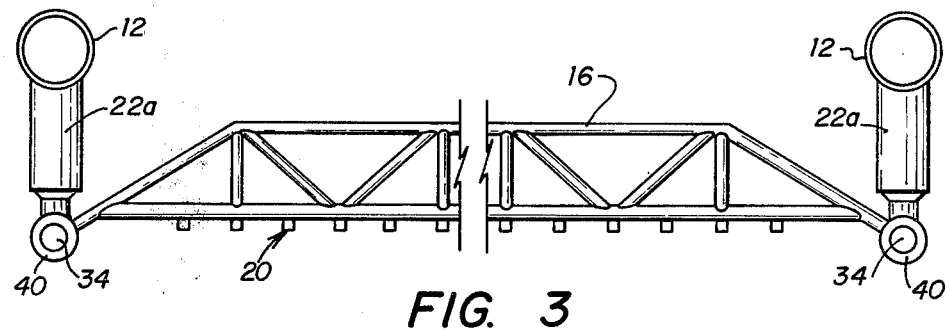
FIG. 3 is a plan view looking in the direction of arrows 3—3 of FIG. 1.

In FIGS. 1-3, the details of one embodiment of a marine landing structure incorporating the present invention is shown. For purposes of reference, the entire system is identified by reference numeral 10. The system 10 is shown attached to two legs 12 of a marine structure 14 such as an offshore platform, dock or the like. The system is rigidly attached to structure 14 in a landing area or the like where vessels may come into contact with the structure. In the embodiment shown, the system 10 is located at the water level and protects legs 12 (and other portions of the structure 14 such as fluid conduits, cross braces and the like) from damage by collision with vessels such as boats and barges docking against or colliding with the structure 14. The marine landing system 10 of the present invention is of the type which has an outer facing contact surface up against which the vessels can contact. In addition as will be described herein, shock or energy absorbing devices are contained in the system 10 and are utilized to absorb energy applied to the frame.

The system 10 has an array of metallic structural elements which are welded together to form a rigid elongated landing frame 16. Frame 16 can be constructed from various types of members and from various materials. In the illustrated embodiment, trusses are used in the design of the frame to add rigidity thereto. The outward facing surface 20 (surface facing away from the structure 14) provides a contact surface. In the embodiments shown, resilient facing is provided for the surface 20. It is understood that various designs, shapes, materials and fabrication techniques could be used to fabricate the landing frame 16, yet only being important that the frame be able to span the landing area and possess sufficient strength to withstand impacts from vessels.

The frame 16 is supported from the legs 12 by two pairs of upper and two lower shock cell means 22a and 22b, respectively. These two pairs of shock cells are positioned at spaced locations on the structure and near the ends of the frame 16. As shown by example in FIG. 2, each of the cells 22a and 22b have an outer tubular arm 24 and an inner arm 26. These arms are partially telescoped along a horizontal extending axis. The outer arm 24 of cell 22a is rigidly fixed to leg 12 by welding at a flange 28 provided on the arm 24 for that purpose. The outer arm 24 of the lower shock cell 22b is rigidly clamped to the leg 12 by clamp assembly 30. It is to be understood that other methods of attaching the arms 24 to the legs 12 could be used as dictated by the design considerations yet only being important that the arms 24 be securely and rigidly fixed to the leg 12.

As can be seen in FIG. 3, a shock element 32 is positioned in the annular space between the arms 24 and 26. In the embodiment shown, element 32 is made from an elastomeric material and is bonded to the interior of arm 24 and the exterior of arm 26. In addition a shear plate 33 such as described in U.S. Pat. No. 4,005,672 can be used.

The outwardly extending ends of the arms 26 of each pair of cells 22a and 22b are rigidly connected to a vertically extending shaft or support member 34. The arms 26 of cells 22a and 22b and support member 34 form rigid shock frames. In the embodiments shown, the arms 26 are rigidly fixed to the support by clamp assemblies 36, it being envisioned, of course, that other means of rigid attachment could be used such as welding or the like.

In the embodiment shown, the support members 34 are shown extending through barge bumper elements 38 which can comprise a plurality of bumper rings such as shown in U.S. Pat. No. 4,005,672.

Figure 7:
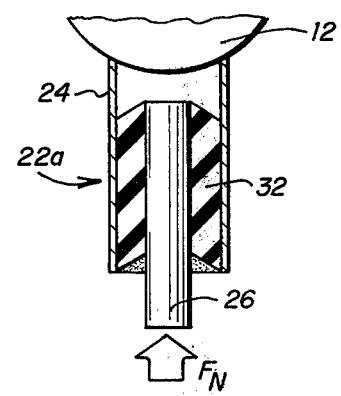
FIGS. 7-9 illustrate in detail the action of the shock element in various loading conditions.
Figure 8:
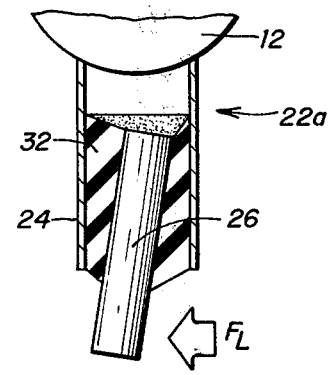
Figure 9:
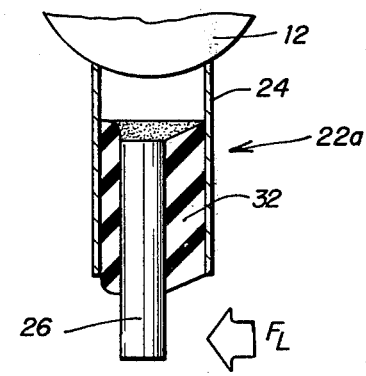
Figure 4:
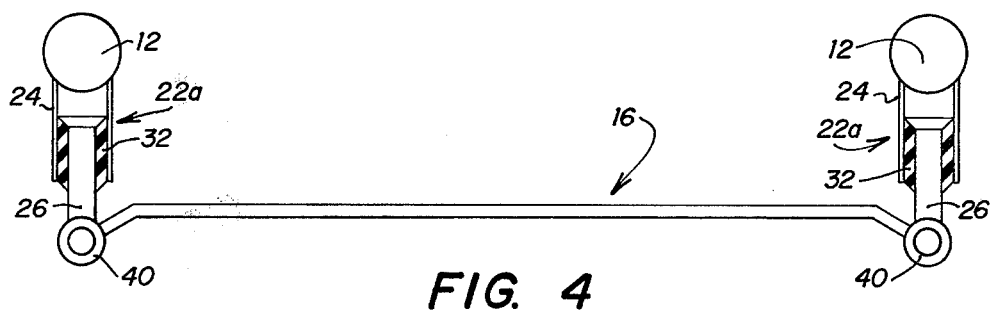
FIG. 4 is a simplified linkage diagram of the present invention shown in the rest position.
Figure 5:
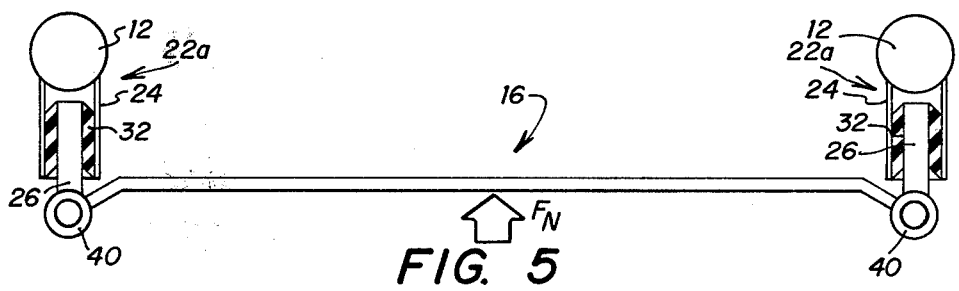
FIG. 5 is a view similar to FIG. 4 showing the action of the system in the presence of a load having a normal component.
Figure 6:
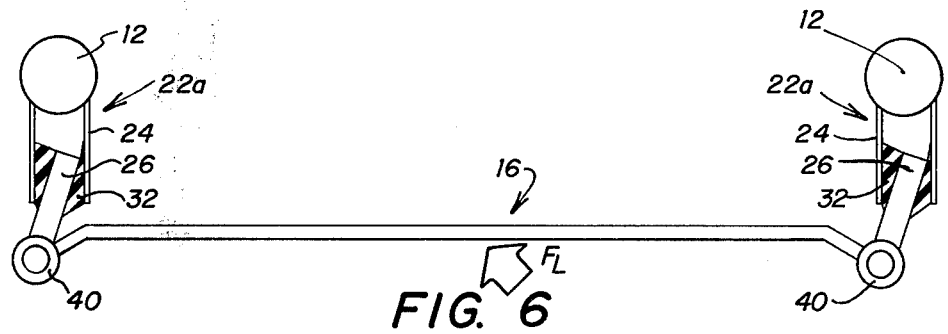
FIG. 6 is a view similar to FIG. 5 showing the action of the system in the presence of a load having a lateral component.

According to a particular feature of the present invention, the landing frame 16 is connected to the support members 34 by means of upper and lower pivot joints 40 and 42, respectively. These pivot joints allow the frame 16 and members 34 to rotate with respect to each other about a vertical axis while preventing any other relative movement between the frame and members 34. Surprisingly this freedom to rotate about a vertical axis allows the system to more effectively function to absorb loads or shocks applied to the system from various directions. In the embodiments shown, these joints 40 and 42 comprise sleeves which are fixed to the frame 16 and are of a size and shape to fit around the outside of members 34 and to rotate thereabout. The sleeves could, of course be split sleeves as shown in FIG. 2. By removing the rigid connection between the landing frame 16 and the shock elements and replacing it with a connection providing relative rotation only about a vertically extending axis, the system is allowed to collapse in some loading conditions and, contrary to what would be expected this lack of complete rigidity at the connection, improves rather than diminishes the shock or energy absorbing characteristics of the system. The advantages of this unorthodox departure from the conventional rigid connection between the elements of the system can best be appreciated by considering FIGS. 4-9. In FIGS. 4-6, the system is illustrated as a link diagram in various loading situations. In FIGS. 7–9, the shock cell 22a is shown in various loading situations.

In FIG. 4, the link diagram shows the system in plan view with the landing frame 16 shown as a single link coupled at 40 to the arms 26 to pivot about the vertical axis. (For purposes of this diagram, the support 34 has been eliminated since it merely comprises a member providing structural integrity for the system and support 34 is merely a rigid extension of arm 26.) Arms 26 are resiliently coupled through shock elements 32 to arm 24. Each of the arms is in turn fixed to leg 12. For purposes of explanation only, the upper shock cells 22a are shown, but because of their location, the lower cells 22b would operate in a similar manner.

For purposes of this explanation, forces or shock load having components solely in the direction normal to the contact surface 20 (and parallel to the axis of the shock cells) are shown in the FIGS. 1, 3, 5 and 7 as a vector and are identified as $F_N$. In addition, forces and shock loads having components which are transverse to the contact surface 20 (and are not parallel to the axis of the shock cells) are shown in FIGS. 3, 6, 8 and 9 as a vector and are identified as $F_L$.

In FIG. 4, the system is shown in its at rest or no load situation. In FIG. 5, the system is shown with a normal load $F_N$ applied thereto. As can be seen, the shock cells 22a react as illustrated in FIG. 7 with a telescoping action occuring between arms 24 and 26 to deform the shock element 32. This is the classical manner in which shock cells have been used to absorb shock.

In FIG. 6, the system is shown with a load having a lateral component $F_L$. This lateral component causes the three bar linkage 26-16-26 to collapse as shown in FIG. 6. This collapsing occurs because of the extra degree of freedom present at the joint 40. This collapsing of the linkage also provides a surprising result, in that it allows the shock cells to deform by axial bending as is shown in FIG. 8. It has been found that this lateral deformation of the shock cell provides good shock or energy absorbing characteristic.

If the system is fixed or rigid between links 16 and 26 (as has been the practice in the past), these improved energy absorbing characteristics would not be present. In FIG. 9, the shock cell 22a is shown with the lateral load $F_L$ applied but the connection between links 16 and 26 rigidly fixed. This fixes the orientation of arm 26 and prevents it from rotating. All of the lateral forces are absorbed in compression and tension in the shock element 32 as it is deformed between the walls of the arms 24 and 26. The limited distance between these two elements causes a stiff or poor shock absorbing reaction to the lateral force $F_L$.

Thus, it has been surprisingly found that by providing an extra degree of freedom about a vertical axis in the coupling between the shock absorbing element and the boat landing frame both, the axial and tortional shock absorbing modes of the shock cell 28 (shown respectively in FIGS. 7 and 8) can be utilized to provide a boat landing system which is not directionally sensitive. This is accomplished by utilizing a system which collapses contrary to the prior thinking that system should be rigid and provides a system which has good shock absorbing characteristics in both lateral and normal directions.

In the embodiments shown, the frame 16 is pivotally connected to the arm 26 through the member 32. It is envisioned, of course, that this pivotal connection can be made directly where space permits by pivotally coupling and supporting the frame from the arm 26 itself. It is also envisioned that even though the embodiment illustrated shows the use of a bumper ring assembly, the system of the present invention could be utilized without the presence of the vertical support 34 or the elements 38. It only being important that sufficient structural integrity be provided to the system to allow that the axis of rotation of the frame with respect to the operative arm of the shock element to remain vertical to remain fixed in all other directions of relative movement.

Although one embodiment of the present invention has been illustrated and other embodiments have been described in the foregoing Detailed Description, it will be understood that the invention is not limited to the embodiments described and is capable of numerous rearrangements, modifications, and substitutions within the scope of the invention as defined by the appended claims.

I claim:

1. An energy absorption system for connection to a marine structure to protect the structure from impact damage from vessels, such as boats, barges and the like, the system comprising:

a rigid landing frame for spanning a landing area, means on said frame for providing a contact surface for receiving impact loads from vessels colliding with said frame;

upper and lower vertically spaced shock cell means having one end coupled to said frame, means on the end opposite said one end for rigidly attaching said shock cell means to said structure; and means operatively connecting said first end of each of said shock cell means to said landing frame to provide limited relative movement between said first ends of said shock cell means and said landing frame, said means permitting rotation only about an axis which extends vertically when said system is attached to a structure and preventing rotation about a horizontally extending axis whereby relative rotation can occur only about the vertical axis between said landing frame and the first ends of each of said shock cell means.

2. The system of claim 1 wherein said shock cell means each comprise a pair of co-axially aligned telescoping arms and resilient means connecting said arms, said resilient means being positioned in the annular space defined between said telescoping arms.

3. The system of claim 2 wherein the axis of said arms extends in a horizontal plane when said system is attached to said structure.

4. The system of claim 1 wherein said means operatively connecting said shock cells to said landing frame comprises a sleeve and a shaft rotatable in said sleeve.

5. The system of claim 2 wherein said means operatively connecting said shock cells to said landing frame comprises a sleeve and a shaft rotatable in said sleeve.

6. An energy absorption system for connection to a marine structure to protect the structure from impact damage from vessels, such as boats, barges and the like, the system comprising:

a rigid landing frame for spanning a landing area, means on said frame for providing a contact surface for receiving impact loads from vessels colliding with said frame;

upper and lower vertically spaced shock cell means having one end coupled to said frame, said shock cell means each comprise a pair of coaxially aligned telescoping arms and resilient means connecting said arms together, said resilient means being positioned in the annular space defined between said telescoping arms, means on the end opposite said one end for rigidly attaching said shock cell means to said structure; and means operatively connecting said first end of each of said shock cell means to said landing frame to provide limited relative movement between said first ends of said shock cell means and said landing frame, said means operatively connecting said shock cells to said landing frame comprises a sleeve and a shaft rotatable in said sleeve, at least one sleeve is connected to said landing frame at each end thereof and wherein one of said shafts is connected to the arms of each of said pair of shock cell means, said connecting means permitting rotation only about an axis which extends vertically when said system is attached to a structure and preventing rotation about a horizontally extending axis whereby relative rotation can occur only about the vertical axis between said landing frame and the first ends of each of said shock cell means.

7. The system of claim 6 wherein split sleeves are provided on at least one of said arms of each of said shock cell means and said shafts are releasably attached within said sleeve.

8. In an energy absorbing system for use in a marine structure to protect the structure from damage from contact with vessels such as boats, barges, and the like, the system having at least two vertically extending rigid shock frames for connection to the structure near the water surface with each shock frame positioned at spaced locations on the structure, shock cell means for coupling each of the shock frames to the structure whereby energy imparted to the shock frame is absorbed before it is transferred to the structure, a boat landing frame supported from said shock frames, said landing frame having a vertically extending contact surface for contact with vessels, and the improvement which comprises means coupling each of said shock frames to said landing frame to provide rotational movement between shock frames and said landing frame only about vertically extending axes and preventing rotational movement between said shock frames and said landing frames about horizontally extending axes.

9. In an energy absorption system for use on a marine structure to protect the structure from impact damage from vessels such as boats, barges, and the like, this system comprises: two spaced shock frames for connection to the structure, each frame having an upper and lower shock cell with one arm of each shock cell connected to said shock frame and the other arm of each shock cell having means for connection to said structure, a vertically extending landing frame supported from and extending between said shock frames; the improvement which comprises means coupling said landing frame to each of said shock frames for providing relative movement therebetween limited to only relative rotational movement about vertical axes between said landing frame and each of said shock frames and prohibiting rotation movement about horizontal axes.

10. An energy absorbing system connected to a marine structure to protect the structure from impact damage, comprising: two vertically extending rigid shock frames supported from the structure in a position near the water surface with each shock frame positioned at spaced locations on the structure, upper and lower vertically spaced shock cell means coupling each of said shock frames to the structure whereby energy imparted to said shock frame is absorbed before it is transferred to said structure, said shock cell means each comprising a pair of coaxially aligned telescoping arms and resilient means connecting said arms, said resilient means being positioned in the annular space defined between said telescoping arms, a rigid boat landing frame spanning a landing area defined between said rigid shock frames, said boat landing frame having vertically extending contact surface for contacting vessels, said boat landing frame being supported from said shock frames, and said shock frames comprising a vertically extending shaft and sleeves on said boat landing frame mounted for rotation around said shafts on said shock frames whereby relative movement between said shock frame and said boat landing frame is limited to a one degree of freedom and said degree of freedom is rotation about a vertical axis whereby impact load directed in a horizontal plane cause relative movement between said boat landing frame and said shock frames.

* * * * *

UNITED STATES PATENT AND TRADEMARK OFFICE
CERTIFICATE OF CORRECTION

PATENT NO. : 4,337,009
DATED : June 29, 1982
INVENTOR(S) : Jay W. Jackson

It is certified that error appears in the above-identified patent and that said Letters Patent are hereby corrected as shown below:

Column 2, line 64, change "boad" to -- boat --;

Column 5, line 15, change "load" to -- loads";

Column 5, line 45, before "the" add -- with --.

Signed and Sealed this

Fifth Day of October 1982

[SEAL]

Attest:

GERALD J. MOSSINGHOFF

Attesting Officer         Commissioner of Patents and Trademarks